(12) United States Patent
Jiang et al.

(10) Patent No.: US 10,540,531 B2
(45) Date of Patent: Jan. 21, 2020

(54) IMAGE IDENTIFICATION METHOD, TERMINAL AND NON-VOLATILE STORAGE MEDIUM

(71) Applicant: TENCENT TECHNOLOGY (SHENZHEN) COMPANY LIMITED, Shenzhen (CN)

(72) Inventors: Mei Jiang, Shenzhen (CN); Hailong Liu, Shenzhen (CN); Pengfei Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 56 days.

(21) Appl. No.: 15/993,738

(22) Filed: May 31, 2018

(65) Prior Publication Data

US 2018/0322321 A1 Nov. 8, 2018

Related U.S. Application Data

(63) Continuation of application No. PCT/CN2017/094013, filed on Jul. 24, 2017.

(30) Foreign Application Priority Data

Jul. 27, 2016 (CN) .......................... 2016 1 0604477

(51) Int. Cl.
*G06K 7/14* (2006.01)
(52) U.S. Cl.
CPC ......... *G06K 7/1443* (2013.01); *G06K 7/1413* (2013.01); *G06K 7/1417* (2013.01)

(58) Field of Classification Search
CPC .................................................... G06K 7/1443
(Continued)

(56) References Cited

U.S. PATENT DOCUMENTS 5,563,958 A 10/1996 Higgins et al.

FOREIGN PATENT DOCUMENTS

CN 101154267 4/2008
CN 102682267 9/2012
(Continued)

OTHER PUBLICATIONS

International Search Report dated Oct. 19, 2017 in PCT/CN2017/094013 filed Jul. 24, 2017. (With English Translation).

*Primary Examiner* — Allyson N Trail
(74) *Attorney, Agent, or Firm* — Oblon, McClelland, Maier & Neustadt, L.L.P.

(57) ABSTRACT

A method and an apparatus for image identification are provided. For example, the processing circuitry of the apparatus obtains first feature values of a first image feature for pixels in an image for barcode detection. The processing circuitry calculates measures that are indicative of changes of the first feature values in multiple directions within the image and determines a target area in the image for the barcode detection according to the measures. Further, the processing circuitry divides the target area into a plurality of sub-areas, and filters the sub-areas to determine a target sub-area for the barcode detection. Then, the processing circuitry obtains second feature values of a second image feature for the target sub-area. The second image feature is derived from the first image feature. The processing circuitry then identifies a barcode type in the target sub-area according to the second image feature.

20 Claims, 8 Drawing Sheets

(58) Field of Classification Search
USPC .................................................. 235/462.08
See application file for complete search history.

(56) References Cited

FOREIGN PATENT DOCUMENTS

| | | |
|---|---|---|
| CN | 105631383 | 6/2016 |
| EP | 0492956 | 7/1992 |

IMAGE IDENTIFICATION METHOD, TERMINAL AND NON-VOLATILE STORAGE MEDIUM

RELATED APPLICATION

This application is a continuation of International Application No. PCT/CN2017/094013, filed on Jul. 24, 2017, which claims priority to Chinese Patent Application No. 201610604477.X, filed with the Chinese Patent Office on Jul. 27, 2016, and entitled "IMAGE IDENTIFICATION METHOD AND TERMINAL". The entire disclosures of the prior applications are hereby incorporated by reference herein in their entirety.

FIELD OF THE TECHNOLOGY

The present disclosure relates to the field of image identification, and in particular, to an image identification method, a terminal and a non-volatile storage medium.

BACKGROUND OF THE DISCLOSURE

A barcode scanning engine needs to scan a barcode on each frame of image in an input image stream. When the input image stream includes a large number of images of no barcode, a resource of a scanning engine is cost, thereby lowering a velocity of identifying an image of a barcode (for example, a one-dimensional barcode and a two-dimensional barcode).

Currently, a one-dimensional barcode image is roughly identified by using simple image gradient information. A specific process thereof includes: first obtaining an original image, the original image being assumed to be a one-dimensional barcode image, calculating a difference between grayscale values of the original image in an x direction and in a y direction because the one-dimensional barcode image is basically a vertical striped pattern, and an absolute difference between the grayscale values of the one-dimensional barcode image in the x direction and in the y direction is relatively great, then performing fixed threshold binarization on the difference between the grayscale values, thereby filtering out a smooth area, and then performing a mean filtering operation and a morphological operation to identify a one-dimensional barcode area of the original image.

However, a vertical one-dimensional barcode can be identified based on the image gradient information. A one-dimensional barcode that is of slight rotation cannot be identified, other codes besides the one-dimensional barcode also cannot be identified. Therefore, limitations of image identification exist. In addition, a morphological operation and a connected domain analysis are both used to calculate pixels one by one. The amount of the calculation is great, and an object of quickly identifying an image cannot be implemented.

SUMMARY

Embodiments of the present disclosure provide an image identification method and a terminal, configured to resolve a problem of limitations of existing image identification. By using the method and the terminal, a one-dimensional barcode in any shape and other code images besides the one-dimensional barcode can both be identified, thereby effectively improving universality and reliability of identifying an image. A morphological operation and a connected domain analysis on an image are not needed, thereby effectively improving a velocity of identifying an image.

A method and an apparatus for image identification are provided. For example, the processing circuitry of the apparatus obtains first feature values of a first image feature for pixels in an image for barcode detection. The processing circuitry calculates measures that are indicative of changes of the first feature values in multiple directions within the image and determines a target area in the image for the barcode detection according to the measures. Further, the processing circuitry divides the target area into a plurality of sub-areas, and filters the sub-areas to determine a target sub-area for the barcode detection. Then, the processing circuitry obtains second feature values of a second image feature for the target sub-area. The second image feature is derived from the first image feature. The processing circuitry then identifies a barcode type in the target sub-area according to the second image feature.

In an embodiment, the first image feature is of a grayscale feature type. For each pixel of the pixels in the image, the processing circuitry calculates a first gradient value of the first image feature in a first direction of the image, and a second gradient value of the grayscale feature type in a second direction of the image. The first direction and the second direction are perpendicular. The processing circuitry then calculates a first absolute value of a difference between the first gradient value and the second gradient value. When the first absolute value is greater than a first preset threshold, the pixel is included in the target area.

In another embodiment, the processing circuitry combines a group of pixels with grayscale differences in a range into the target area. The range is determined according to a second preset threshold.

To filter the sub-areas to determine the target sub-area for the barcode detection, in an embodiment, the processing circuitry selects, for each pixel in a group of pixels in a sub-area, adjacent pixels in the sub-area that are adjacent to the pixel. Then, the processing circuitry determines first comparison relationships of grayscale values between the pixel and the adjacent pixels, and forms a local binary pattern (LBP) code according to the first comparison relationships. Further, the processing circuitry determines a number of binary switching in the LBP code to be associated with the pixel. Then, the processing circuitry calculates a sum of the numbers of the binary switching associated with the group of pixels in the sub-area and determines the sub-area as the target sub-area when the sum of the binary switching in the sub-area is greater than a third preset threshold.

In another embodiment, the processing circuitry calculates, for each pixel in a group of the pixels in a sub-area, a first absolute value of a first grayscale value in a horizontal direction and a second absolute value of a second grayscale value in a vertical direction. Then, the processing circuitry adds the first absolute value and the second absolute value to calculate an absolute sum value that is associated with the pixel. Further, the processing circuitry adds the absolute sum values associated with the group of the pixels in the sub-area to calculate a filtering value, and determining the sub-area to be the target sub-area when the filing value is greater than a fourth preset threshold.

In an embodiment, the second image feature is a Fern feature. The processing circuitry determines second comparison relationships of every two pixels in a group of pixels in the target sub-area, and obtains the Fern feature in binary based on the second comparison relationships. Then, the processing circuitry converts the Fern feature into a decimal number, and inputs the decimal number into a target function associated with a specific barcode type. The processing circuitry determines whether the barcode type of the image in the target sub-area is the specific barcode type according to an output result of the target function.

In another embodiment, the second image feature is a Tree feature. The processing circuitry forms a tree structure using a group of pixels in the target sub-area as tree nodes. Then, the processing circuitry determines third comparison relationships of branches at the tree nodes and determines the Tree feature in binary by walking the tree structure from a root tree node to a leaf tree node based on the third comparison relationships. Further, the processing circuitry converts the Tree feature into a decimal number and inputs the decimal number into a target function associated with a specific barcode type. The processing circuitry determines whether the barcode type of the image in the target sub-area is the specific barcode type according to an output result of the target function.

Aspects of the disclosure provide a non-transitory computer-readable medium storing instructions which when executed by a computer cause the computer to perform the method for image identification.

It can be seen from the foregoing technical solutions that the embodiments of the present disclosure have the following advantages:

After a first image feature of a target image is obtained, a target area of the target image is determined according to the first image feature. For example, an approximate code area is determined according to the first image feature. The target area is divided into a plurality of sub-areas, and a target sub-area of the target image is determined by filtering images corresponding to the sub-areas, identifying a code type of the image in the target sub-area according to an obtained second image feature of an image corresponding to the target sub-area. For example, an accurate code area is determined within the approximate code area, and then the code type of the image is identified on the accurate code area, for example, a one-dimensional barcode, a two-dimensional barcode or no barcode. It can be learned that the code type is not limited to a one-dimensional barcode, and may alternatively be other code images besides the one-dimensional barcode, thereby effectively improving universality and reliability of identifying an image. A morphological operation and a connected domain analysis on an image are not needed, thereby effectively improving a velocity of identifying an image.

DESCRIPTION OF EMBODIMENTS

Figure 1:
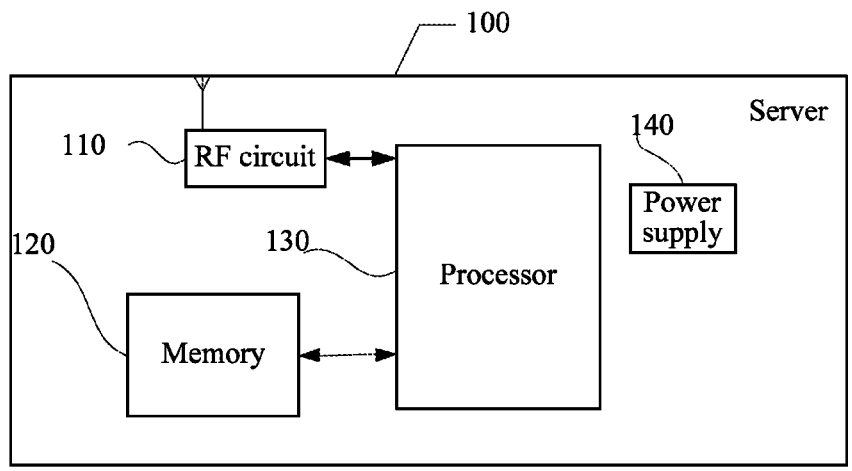
FIG. 1 is a schematic structural diagram of a terminal according to an embodiment of the present disclosure.

Embodiments of the present disclosure provide an image identification method and a terminal, configured to resolve a problem of limitations of existing image identification. By using the method and the terminal, a one-dimensional barcode in any shape and other barcode images besides the one-dimensional barcode can both be identified, thereby effectively improving universality and reliability of identifying an image. A morphological operation and a connected domain analysis on an image are not needed, thereby effectively improving a velocity of identifying an image.

The following clearly and completely describes the technical solutions in the embodiments of the present disclosure with reference to the accompanying drawings in the embodiments of the present disclosure. The described embodiments are only some embodiments instead of all embodiments of the present disclosure. All other embodiments obtained by a person skilled in the art based on the embodiments of the present disclosure fall within the protection scope of the present disclosure.

In the specification, claims, and accompanying drawings of the present disclosure, the terms "first", "second", "third", "fourth", and so on (if existing) are intended to distinguish between similar objects rather than describe a specific order or a precedence order. It is understood that the data termed in such a way are interchangeable in proper circumstances so that the embodiments described herein can be implemented in other orders than the order illustrated or described herein. In addition, terms, "including" and "having", and any variation thereof, are intended to cover non-exclusive inclusion, for example, a series of steps are included, or a process, method, system, and product of a unit, or a device is not necessarily limited to listed steps or units, and can include another step or unit that is not clearly listed or is inherent to the process, method, product, or device.

Before the embodiments of the present disclosure are described, terms related to the embodiments of the present disclosure are first described.

A term "grayscale value" is defined as a color depth in a grey image. The grayscale value usually ranges from 0 to 255, where a white grayscale value is 255, and a black grayscale value is 0.

A term "local binary patterns" (English full name: local binary patterns, LBP for short) is an operator used for describing a partial texture feature of an image, and has prominent advantages such as rotation invariance and grayscale invariance. The LBP operator may obtain an LBP code from each pixel. After an original LBP operator is extracted from an image recording a grayscale value of each pixel, an obtained original LBP feature is still an image, and the obtained image records an LBP code value of each pixel.

A term "cluster analysis" is also referred to as a group analysis, and is defined as a multivariate statistical analysis method for classifying, according to the principle of "like attracts like", samples or indexes. An object discussed by the cluster analysis is a large number of samples required to be reasonably classified according to a respective feature. No mode is provided for reference or compliance. That is, the classification is performed without prior knowledge. The cluster analysis is a process during which data is classified into different categories or clusters. Therefore, objects in a same cluster have a great similarity, and objects in different clusters have a great difference. An object of the cluster analysis is to collect data based on a similarity to classify the data. Cluster derives from a lot of fields, including mathematics, computer science, statistics, biology and economics. In different application fields, a lot of cluster technologies are developed. The technology methods are used for describing data, balancing a similarity between different data sources, and classifying the data sources into different clusters.

In a term "connected domain analysis", a connected domain is usually defined as an image area including foreground pixels that have a same pixel value and that are adjacent to each other in an image. The connected domain analysis means finding out each connected domain in an image and marking, and is a relatively common and basic method in the field of image analysis and processing, for example, motion foreground target segmentation and extraction in visual tracking or medical image processing. The motion foreground target segmentation and extraction in the visual tracking may include pedestrian intrusion detection, legacy object detection, vehicle detection and tracking based on vision, and so on. The medical image processing may include interested target Area extraction. That is, a connected domain analysis method can be used in an application scenario where a foreground target needs to be extracted so as to subsequently process the foreground target. An object processed by the connected domain analysis is usually an binary image.

The following describes application scenarios possibly related to the present disclosure by using examples:

In real life, when a user purchases a product in a mall, it possibly relates to that a salesperson scans a barcode of the product by using a barcode scanner, thereby determining price information of the product. If the user wants to know a price of a product, the user may directly scan a barcode of the product by using scanning software on a terminal, thereby obtaining price information of the product. Currently, some social applications are widely popular. For example, a user A may add a user B as a Wechat friend by scanning a Wechat two-dimensional barcode of the user B. Therefore, scanning of a one-dimensional barcode, a two-dimensional barcode or other codes in the future brings great convenience to a user's life. However, during scanning a code, it relates to identifying image information. An image needs to be determined whether to be an image of a one-dimensional barcode, a two-dimensional barcode or no barcode, then the image is decoded by using a corresponding decoder. Using a Wechat product as an example, after a user turns on a function of "scanning", a real-time image stream obtained from a camera of a mobile phone is sent to a QBar barcode scanning engine to be decoded after being focus-positioned. The QBar barcode scanning engine is a two-dimensional barcode and barcode identification engine that is obtained by developing after long-term optimization and improvement of a two-dimensional barcode and barcode identification technology by using a Wechat mode identification center.

A related barcode scanning engine technology needs to decode a one-dimensional barcode and a two-dimensional barcode on each frame of input image, thereby affecting a velocity of identifying a code. In the present disclosure, when a terminal activates a barcode scanning function, the terminal automatically calls a barcode scanning predetermining module to identify a one-dimensional barcode/a two-dimensional barcode. The barcode scanning predetermining module determines a target area of an image by first extracting a first image feature of the image, divides the target area into a plurality of sub-areas, and further filters the plurality of sub-areas, thereby determining a target sub-area of the image. Then the barcode scanning predetermining module extracts a second image feature corresponding to the target sub-area, and determines a code type of an image corresponding to the target sub-area, for example, a one-dimensional barcode, a two-dimensional barcode or no barcode. It can be learned that the code type is not limited to a one-dimensional barcode, and may alternatively be other code images besides the one-dimensional barcode, thereby effectively improving universality and reliability of identifying an image. A morphological operation and a connected domain analysis on an image are not needed, thereby effectively improving a velocity of identifying an image.

The following describes a terminal related to the present disclosure. As shown in FIG. 1, an exemplary structure of the terminal is described. The terminal 100 includes components such as a radio frequency (English full name: Radio Frequency, RF for short) circuit 110, a memory 120, a processor 130 and a power supply 140. A person skilled in the art may understand that the structure of the terminal 100 shown in FIG. 1 does not constitute a limitation to the terminal, and the terminal may include more components or fewer components than those shown in the figure, or some components may be combined, or a different component deployment may be used.

The RF circuit 110 may be configured to send and receive information, for example, receiving and sending of a signal. Generally, the RF circuit 110 includes, but is not limited to, an antenna, at least one amplifier, a transceiver, a coupler, a low noise amplifier (English full name: Low Noise Amplifier, LNA for short), a duplexer, and so on. In addition, the RF circuit 110 may also communicate with a network and another device such as a terminal by wireless communication. The wireless communication may use any communications standard or protocol, which includes, but is not limited to, Global System of Mobile communication (English full name: Global System of Mobile communication, GSM for short), General Packet Radio Service (English full name: General Packet Radio Service, GPRS for short), Code Division Multiple Access (English full name: Code Division Multiple Access, CDMA for short), Wideband Code Division Multiple Access (English full name: Wideband Code Division Multiple Access, WCDMA for short), Long Term Evolution (English full name: Long Term Evolution, LTE for short), e-mail, Short Messaging Service (English full name: Short Messaging Service, SMS for short), and the like.

The memory 120 may be configured to store a software program and a module. The processor 130 runs the software program and the module stored in the memory 120, to implement various functional applications and data processing of the terminal 100. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 100, and the like. In addition, the memory 120 may include a high speed random access memory, and may further include a non-volatile memory, such as at least one magnetic disk storage device, a flash memory, or other volatile solid-state storage devices.

The processor 130 is a control center of the terminal 100, and is connected to various parts of the terminal 100 by using various interfaces and lines. By running or executing the software program and/or the module stored in the memory 120, and invoking data stored in the memory 120, the processor 130 performs various functions and data processing of the terminal 100, thereby performing overall monitoring on the terminal 100. Optionally, the processor 130 may include one or more processing units. In an embodiment of the present disclosure, the processor 130 may integrate an application processor and a modem processor. The application processor mainly processes an operating system, a user interface, an application program, and the like. The modem processor mainly processes wireless communication. It may be understood that the foregoing modem processor may alternatively not be integrated into the processor 130.

The terminal 100 further includes the power supply 140 (such as a battery) for supplying power to the components. In an embodiment of the present disclosure, the power supply may be logically connected to the processor 130 by using a power management system, thereby implementing functions such as charging, discharging and power consumption management by using the power management system.

Although not shown, the terminal 100 may further include an input unit, a display unit, and so on. Details are not described herein again.

In the embodiment of the present disclosure, the processor 130 is configured to perform the following steps:
obtaining a first image feature of a target image;
determining a target area of the target image according to the first image feature;
dividing the target area into a plurality of sub-areas, and determining a target sub-area of the target image by filtering the sub-areas;
obtaining a second image feature of an image corresponding to the target sub-area; and
identifying a code type of the image in the target sub-area according to the second image feature, the code type including at least one of a one-dimensional code, a two-dimensional code or no barcode.

In some possible implementations, the first image feature may be a grayscale value. In this case, the processor 130 is further configured to: determine a first absolute value corresponding to each pixel in the target image, the first absolute value being an absolute value of a difference between a gradient of a grayscale value of the pixel in a horizontal direction and a gradient of a grayscale value of the pixel in a vertical direction; respectively compare the first absolute value corresponding to each pixel with a first preset threshold; and determine an area corresponding to all pixels whose first absolute values are greater than the first preset threshold, as the target area.

In some possible implementations, the processor 130 is further configured to: determine a second absolute value corresponding to any two pixels in the target image, the second absolute value being an absolute value of a difference between grayscale values of the any two pixels; compare the second absolute value with a second preset threshold; and determine an area corresponding to all pixels whose second absolute values are less than the second preset threshold, as the target area.

In some possible implementations, the processor 130 is further configured to: determine a first pixel in an image corresponding to each sub-area, and adjacent pixels adjacent to the first pixel; determine a first grayscale value magnitude relationship between a grayscale value of the first pixel and a grayscale value of each of the adjacent pixels; determine, according to the first grayscale value magnitude relationship, a local binary patterns (LBP) code of each adjacent pixel of the first pixel; determine a number of LBP code hoppings in the local binary patterns (LBP) code of each adjacent pixel of the first pixel, and the number of LBP code hoppings is a number of times of changing from 1 to 0 or changing from 0 to 1; obtain a sum of numbers of LBP code hoppings of all pixels in the image corresponding to each sub-area; and determine a sub-area whose sum of the numbers of the LBP code hoppings is greater than a third preset threshold, as the target sub-area.

In some possible implementations, the processor 130 is further configured to: determine a first absolute sum value of each pixel in an image corresponding to each sub-area, the first absolute sum value being a sum of an absolute value of a grayscale value of the pixel in a horizontal direction and an absolute value of a grayscale value of the pixel in a vertical direction; obtain a sum of first absolute sum values of all pixels in the image corresponding to each sub-area; and determine a sub-area whose sum of the first absolute sum values is greater than a fourth preset threshold, as the target sub-area.

In some possible implementations, the processor 130 is configured to: obtain a second grayscale value magnitude relationship between grayscale values of any two pixels in the image corresponding to the target sub-area; determine a Fern feature of the image corresponding to the target sub-area according to the second grayscale value magnitude relationship, the Fern feature being represented by a binary bit; convert the Fern feature into a decimal number; input the decimal number into a target function; and identify the code type of the image in the target sub-area according to an output result of the target function.

In some possible implementations, the processor 130 is configured to: obtain a third grayscale value magnitude relationship between grayscale values of two pixels corresponding to each tree node in the image corresponding to the target sub-area; determine a Tree feature of the image corresponding to the target sub-area according to the third grayscale value magnitude relationship, the Tree feature being represented by a binary bit; convert the Tree feature into a decimal number; input the decimal number into a target function; and identify the code type of the image in the target sub-area according to an output result of the target function.

Figure 2:
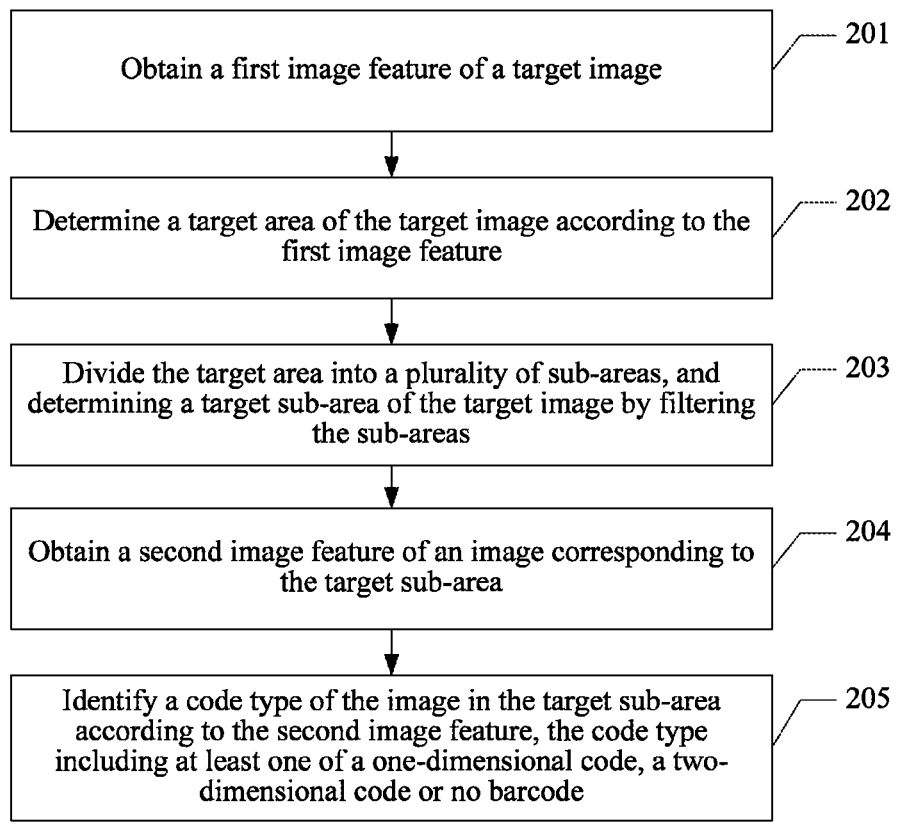
FIG. 2 is a schematic diagram of an embodiment of an image identification method according to an embodiment of the present disclosure.

Referring to FIG. 2, FIG. 2 is a schematic diagram of an embodiment of an image identification method according to an embodiment of the present disclosure. The process is as follows:

Step S201: Obtain a first image feature of a target image.

In the embodiment of the present disclosure, an obtained target image is possibly a color image, and is alternatively possibly a black-and-white image. The target image is a to-be-identified image. The first image feature is image information that representing the target image, for example, a grayscale value, a luminance value, and a color coordinate. This is not specifically limited herein. The embodiment of the present disclosure is described by using that the first image feature is a grayscale value as an example.

Step S202: Determine a target area of the target image according to the first image feature.

In the embodiment of the present disclosure, a target area of the target image is determined according to the first image feature. The target area is an approximate area corresponding to a code area. For example, a rough code area of the target image is determined according to the first image feature.

In actual application, there are a lot of methods for determining a target area of the target image according to the first image feature, for example, a cluster analysis, a connected domain analysis, and a gradient difference-binary analysis. This is not specifically limited herein.

Step S203: Divide the target area into a plurality of sub-areas, and determine a target sub-area of the target image by filtering the sub-areas;

In the embodiment of the present disclosure, the target area is divided into a plurality of sub-areas according to a preset rule. For example, the target area is divided into sliding windows configured to detect LBP weak classifiers.

In the embodiment of the present disclosure, a target sub-area of the target image is obtained by filtering the sub-areas. It can be learned that the target sub-area is a relatively accurate code area. In actual application, an LBP weak classifier may be used to collect statistics of LBP hoppings. Images corresponding to the target area are filtered by using a filtering method for a Sobel gradient statistics, thereby determining a target sub-area of the target image. This is not specifically limited herein.

Step S204: Obtain a second image feature of an image corresponding to the target sub-area.

In the embodiment of the present disclosure, when a target sub-area of the target image is determined, a second image feature of an image corresponding to the target sub-area is obtained. The second image feature is a featured obtained after an original feature of the target image is processed, so that a code type of the target image is subsequently determined according to the second image feature. In actual application, the second image feature may be a simple and quick image feature such as a Fern feature, a Haar feature, or a Tree feature. This is not specifically limited herein. A calculation method of the Haar feature is similar to that of the Fern feature. The method is calculating a difference between sums of grayscale values of all pixels within two adjacent areas in the image. A calculation method of the Tree feature is similar to that of the Fern feature. The method is also comparing grayscale values of a pair of pixels at any position. A difference is that a structure of a calculation feature of the Tree feature is tree-shaped.

Step S205: Identify a code type of the image in the target sub-area according to the second image feature, the code type including at least one of a one-dimensional code, a two-dimensional code or no barcode.

In the embodiment of the present disclosure, a code type of the image in the target sub-area is identified according to the second image feature, for example, a one-dimensional code, a two-dimensional code or no barcode. It can be learned that the code type is not limited to a one-dimensional barcode, and may alternatively be other code images besides the one-dimensional barcode, thereby effectively improving universality and reliability of identifying an image. A morphological operation and a connected domain analysis on an image are not needed, thereby effectively improving a velocity of identifying an image.

Figure 3:
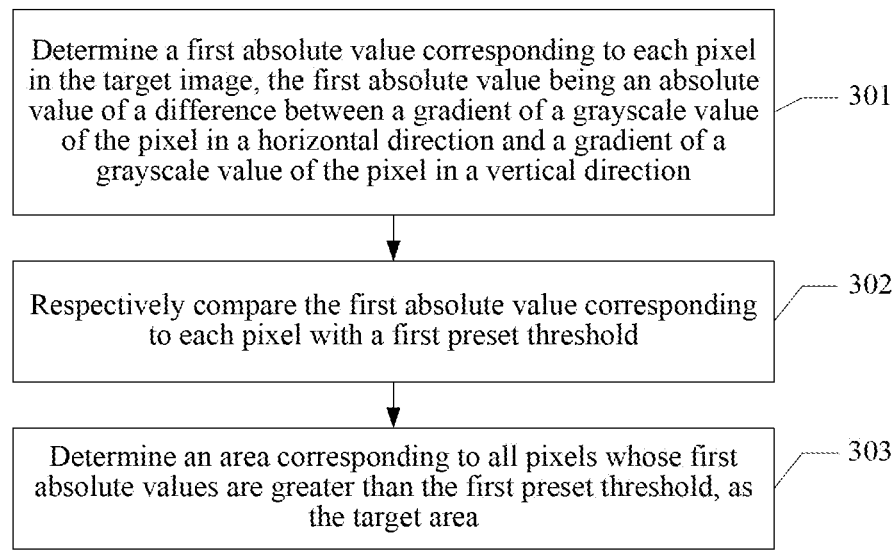
FIG. 3 is a schematic flowchart of determining a target area according to an embodiment of the present disclosure.

In some possible implementations, as shown in FIG. 3, when the first image feature is a grayscale value, the determining a target area of the target image according to the first image feature includes the following process:

Step S301: Determine a first absolute value corresponding to each pixel in the target image, the first absolute value being an absolute value of a difference between a gradient of a grayscale value of the pixel in a horizontal direction and a gradient of a grayscale value of the pixel in a vertical direction.

The target image includes a plurality of pixels. Each pixel has a corresponding first absolute value. A first absolute value corresponding to any pixel is an absolute value of a difference between a gradient of a grayscale value of the pixel in a horizontal direction and a gradient of a grayscale value of the pixel in a vertical direction.

Step S302: Respectively compare the first absolute value corresponding to each pixel with a first preset threshold.

Because the target image includes a plurality of pixels, the first absolute value corresponding to each pixel is respectively compared with a first preset threshold.

Step S303: Determine an area corresponding to all pixels whose first absolute values are greater than the first preset threshold, as the target area.

An area corresponding to all pixels whose first absolute values are greater than the first preset threshold is determined as the target area, and a smooth area corresponding to all pixels whose first absolute values are less than or equal to the first preset threshold is filtered out.

In actual application, because a one-dimensional barcode/two-dimensional barcode image has relatively strong gradient change information, a gradient difference is used to roughly position a code area, to quickly filter out a smooth area in an image, to reduce interference caused during subsequently accurately positioning. A gradient difference calculation and a binary calculation are represented by using the following formulas:

$$G_{diff}=|G_x-G_y|,\ G_x=I_x+1-I_{x-1},\ G_y+1-I_{y-1};\ \text{and}$$

$$G_{diff}=255,\ \text{if}\ G_{diff}>thr;\ G_{diff}=0,\ \text{if}\ G_{diff}\leq thr.$$

I represents a grayscale value; x and y respectively represent a horizontal direction and a vertical direction; G represents a gradient value, a $G_{diff}$ represents a gradient difference; and thr represents a first preset threshold. Thr is usually approximately 70.

In a binary image, a rough code area is determined by analyzing a histogram of a horizontal direction and a vertical direction of the image.

Figure 4:
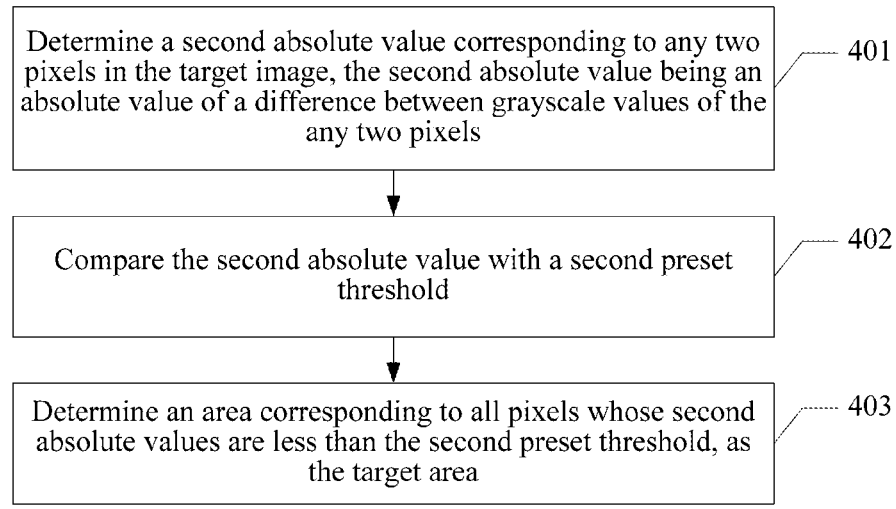
FIG. 4 is another schematic flowchart of determining a target area according to an embodiment of the present disclosure.

In another possible implementation, as shown in FIG. 4, when the first image feature is a grayscale value, the determining a target area of the target image according to the first image feature includes the following process:

Step S401: Determine a second absolute value corresponding to any two pixels in the target image, the second absolute value being an absolute value of a difference between grayscale values of the any two pixels.

A target image includes a plurality of pixels. Any two pixels are selected to calculate an absolute value of a difference between grayscale values of the any two pixels, and the target image may determine second absolute value corresponding to a plurality of pairs of pixels. For example, a second absolute difference corresponding to a pixel a and a pixel b are represented by $I_{diff}$, and $I_{diff}=|I_a-I_b|$. $I_a$ represents a grayscale value of the pixel a, and $I_b$ represents a grayscale value of the pixel b.

Step S402: Compare the second absolute value with a second preset threshold.

Step S403: Determine an area corresponding to all pixels whose second absolute values are less than the second preset threshold, as the target area.

Each second absolute difference is respectively compared with a second preset threshold, and an area corresponding to all pixels whose second absolute values are less than the second preset threshold is determined as the target area. Still referring to an example in step S401, $I_{diff}$ is assumed less than a second preset threshold, and the pixel a and the pixel b are pixels of the target area. Similarly, a second absolute value corresponding to a pixel c and a pixel d is assumed less than the second preset threshold, by such analogy, an area corresponding to pixels that satisfy a condition, for example, the pixel a, the pixel b, the pixel c and the pixel d, is determined as the target area.

Figure 5:
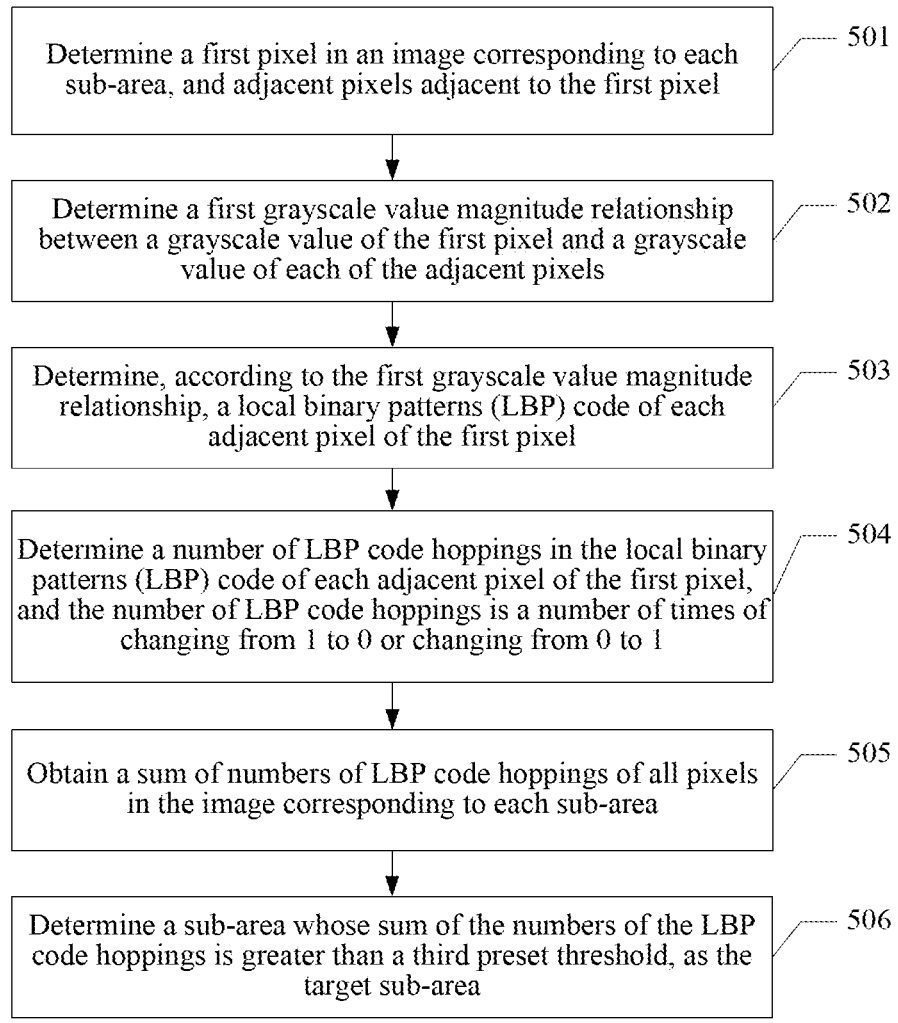
FIG. 5 is a schematic flowchart of determining a target sub-area according to an embodiment of the present disclosure.

In some possible implementations, as shown in FIG. 5, the determining, by filtering images corresponding to the sub-areas, a target sub-area of the target image includes the following process:

Step S501: Determine a first pixel in an image corresponding to each sub-area, and adjacent pixels adjacent to the first pixel.

In the embodiment of the present disclosure, the image of each sub-area includes a plurality of pixels. A pixel is first selected as a first pixel, and other pixels adjacent to the first pixel is a second pixel.

Step S502: Determine a first grayscale value magnitude relationship between a grayscale value of the first pixel and a grayscale value of each of the adjacent pixels.

A first grayscale value magnitude relationship between the first pixel and the pixels adjacent to the first pixel is determined. For example, a grayscale value of a pixel is $I_0$, grayscale values of pixels adjacent to the pixel are respectively $I_1, I_2, I_3, I_4 \ldots$, and a magnitude relationship between $I_0$ and $I_1, I_2, I_3, I_4 \ldots$ is determined.

Step S503: Determine, according to the first grayscale value magnitude relationship, a local binary patterns (LBP) code of each adjacent pixel of the first pixel.

In the embodiment of the present disclosure, after a magnitude relationship between a grayscale value of the first pixel and grayscale values of the adjacent pixels in the image corresponding each sub-area is determined, a local binary patterns (LBP) code of each adjacent pixel of the first pixel is determined according to the magnitude relationship. In general, when the grayscale value of the first pixel is less than a grayscale value of an adjacent pixel, an LBP code corresponding to the adjacent pixel is 0, and when the grayscale value of the first pixel is greater than/equal to a grayscale value of an adjacent pixel, an LBP code corresponding to the adjacent pixel is 1. Still referring to an example of step S502, an LBP code corresponding to $I_1$ is 0 provided that $I_0<I_1$, and an LBP code corresponding to $I_2$ is 1 provided that $I_0>I_2$.

Step S504: Determine a number of LBP code hoppings in the local binary patterns (LBP) code of each adjacent pixel of the first pixel, the number of LBP code hoppings being a number of times of changing from 1 to 0 or changing from 0 to 1.

In the embodiment of the present disclosure, a number of LBP code hoppings is determined according to an LBP code corresponding to each adjacent pixel of the first pixel. For example, the number of LBP code hoppings changes from 0 to 1 or changing from 1 to 0. This is not specifically limited herein.

Step S505: Obtain a sum of numbers of LBP code hoppings of all pixels in the image corresponding to each sub-area.

In the embodiment of the present disclosure, statistics of a sum of numbers of LBP code hoppings of all pixels in the image corresponding to each sub-area is collected.

Step S506: Determine a sub-area whose sum of the numbers of the LBP code hoppings is greater than a third preset threshold, as the target sub-area.

In the embodiment of the present disclosure, a sub-area whose sum of the numbers of the LBP code hoppings is greater than a third preset threshold is determined as the target sub-area. Therefore, the target sub-area is an accurate code area, and the third preset threshold is usually 780. This is not specifically limited herein In actual application, to detect a target area in any size in an image, a pyramid including images in different sizes usually needs to be calculated, a classifier obtained by training is called on each layer of the pyramid to perform detection on sliding windows, and output a position of a candidate window. To improve a detection speed, the windows may be quickly filtered by using an LBP feature value. A reason for using the feature is that a one-dimensional barcode/a two-dimensional barcode has a relatively strong texture feature. The LBP feature value has an incomparable advantage in an aspect of describing image texture information.

A binary relationship of each pixel in an image and a partial neighborhood pixel in the image in grayscale is first calculated, and next the binary relationship forms an LBP code in a particular manner, and then an LBP histogram is obtained by collecting statistics of the LBP code of the target area, and is used as texture descriptions of the area.

Formulas related to the LBP code is:

$$LBP = \bigoplus_{k=1}^{N-1} s(I_c, I_k), s(I_c, I_k) = \begin{cases} 1 & I_c \geq I_k \\ 0 & I_c < I_k \end{cases} \cdot I_c$$

$I_c$ is a grayscale value of a central pixel, $I_k (k=0, 1, 2, \ldots, N-1)$ is grayscale values of N neighborhood pixels that are distributed in equal intervals at the central pixel, $\oplus$ is a tandem operator, and s is used for comparison. When $I_c \geq I_k$, $s(I_c, I_k)=1$; and when $I_c<I_k$, $s(I_c, I_k)=0$.

Figure 6A:
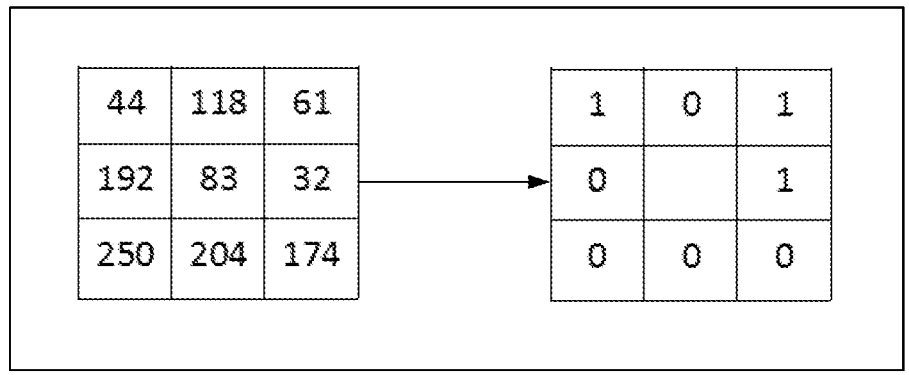
FIG. 6a is a schematic flowchart of calculating a number of LBP hoppings according to an embodiment of the present disclosure.

As shown in FIG. 6a, a grayscale value of a central pixel is compared with grayscale values of 8 neighborhood pixels. If the grayscale values of the neighborhood pixels are greater than or equal to the grayscale value of the central pixel, values of the neighborhood pixels in an LBP code sequence is 1, and if the grayscale values of the neighborhood pixels are not greater than or equal to the grayscale value of the central pixel, values of the neighborhood pixels in an LBP code sequence is 0. Therefore, the 8 neighborhood pixels after comparison are sequentially coded as an 8-bit binary number, including two ends of an adjacent pixel. A number of LBP hoppings corresponding to the central pixel is 4 (changing from 0 to 1 or 1 to 0).

To reduce operation complexity of the algorithm, only statistics of a sum of numbers of LBP hoppings of all pixels in a range of each sliding window are collected. Actually this is effective compression on an original LBP code, and can also effectively reduce interference caused by noise in an image when ensuring no information is lost. A calculation method of the number of LBP hoppings is shown in FIG. 6a. For example, the number of LBP code hoppings from 0 to 1 or from 1 to 0 reflects a texture change of an image partial area.

A number of LBP hoppings is extracted from each pixel in a sliding window, and then a sum of numbers of LBP hoppings of all pixels in the window are accumulated. The accumulated sum of the numbers of the LBP hoppings is compared with a preset threshold (the preset threshold in the present disclosure is 780). If the accumulated sum of the numbers of the LBP hoppings is greater than the preset threshold, the sliding window area is determined to pass and next process is entered, or f the accumulated sum of the numbers of the LBP hoppings is not greater than the preset threshold, the process ends.

Figure 7:
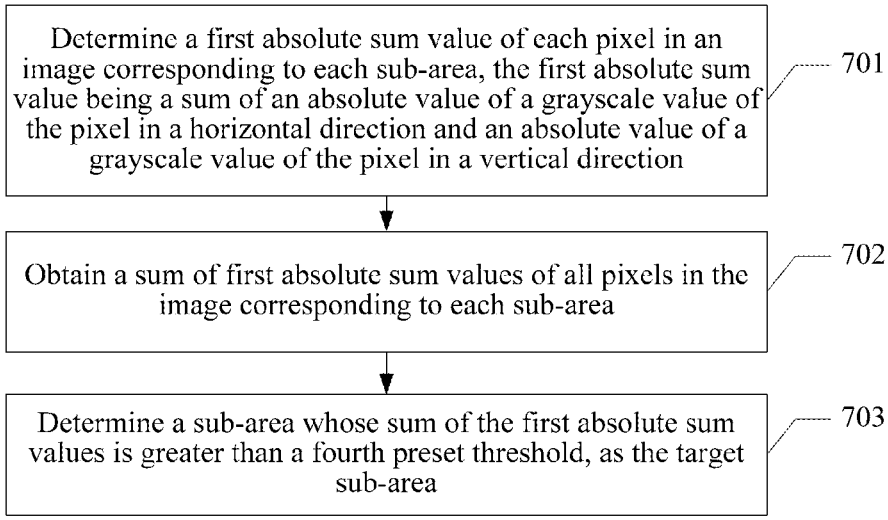
FIG. 7 is another schematic flowchart of determining a target sub-area according to an embodiment of the present disclosure.

In some other possible implementations, as shown in FIG. 7, the determining a target sub-area of the target image by filtering the sub-areas includes the following process:

Step S701: Determine a first absolute sum value of each pixel in an image corresponding to each sub-area, the first absolute sum value being a sum of an absolute value of a grayscale value of the pixel in a horizontal direction and an absolute value of a grayscale value of the pixel in a vertical direction.

In the embodiment of the present disclosure, an image of each sub-area includes a plurality of pixels, and a first absolute sum value of each pixel is obtained. For example, a first absolute sum value of a pixel a is a sum of an absolute value of a grayscale value of the pixel a in a horizontal direction and an absolute value of a grayscale value of the pixel a in a vertical direction.

Step S702: Obtain a sum of first absolute sum values of all pixels in the image corresponding to each sub-area.

In the embodiment of the present disclosure, because each sub-area correspondingly has a plurality of pixels, a sum of first absolute sum values of all pixels in the image corresponding to each sub-area is obtained. For example, a sub-area has a pixel a, a pixel b and a pixel c (this is to describe by using an example, and in actual application, each sub-area has a lot of pixels), a first absolute sum value corresponding to the pixel a is $I_1$, a first absolute sum value corresponding to the pixel b is $I_2$, a first absolute sum value corresponding to the pixel c is $I_3$, and a first absolute sum value corresponding to the sub-area is $I_{sum}=I_1+I_2+I_3$.

Step S703: Determine a sub-area whose sum of the first absolute sum values is greater than a fourth preset threshold, as the target sub-area.

In the embodiment of the present disclosure, a sum of first absolute sum values corresponding to each sub-area is obtained, and a sub-area whose sum of the first absolute sum values is greater than a fourth preset threshold is determined as the target sub-area. For example, still referring to an example of step S703, $I_{sum}$ is assumed greater than a fourth preset threshold, and the sub-area is determined as the target sub-area.

Figure 8:
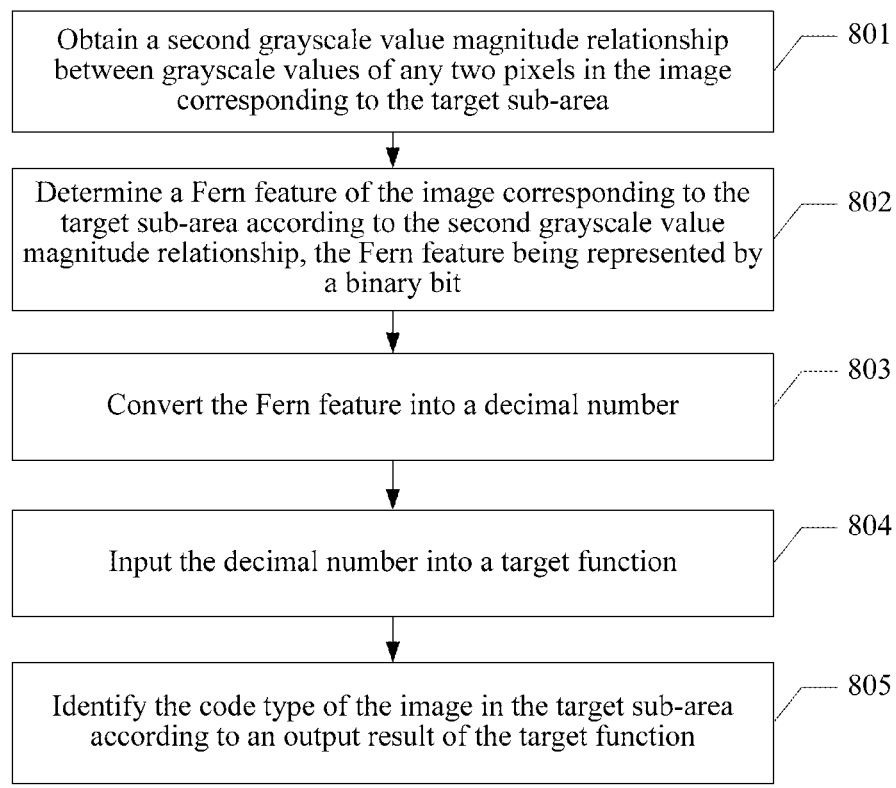
FIG. 8 is a schematic flowchart of a code type of an identified image according to an embodiment of the present disclosure.

In some possible implementations, as shown in FIG. 8, when the second image feature is a Fern feature, the obtaining a second image feature of an image corresponding to the target sub-area and identifying a code type of the image in the target sub-area according to the second image feature includes the following process:

Step S801: Obtain a second grayscale value magnitude relationship between grayscale values of any two pixels in the image corresponding to the target sub-area.

In the embodiment of the present disclosure, grayscale values of any two pixels in the image corresponding to the target sub-area are obtained. For example, a grayscale value of a pixel a is $I_1$, and a grayscale value of a pixel b is $I_2$. $I_1>I_2$ is a second grayscale value magnitude relationship between a pixel a and a pixel b provided that $I_1>I_2$.

Step S802: Determine a Fern feature of the image corresponding to the target sub-area according to the second grayscale value magnitude relationship, the Fern feature being represented by a binary bit.

Step S803: Convert the Fern feature into a decimal number.

Step S804: Input the decimal number into a target function.

Step S805: Identify the coding type of the image in the target sub-area according to an output result of the target function.

In an embodiment of the present disclosure, a target function is a function that inputs a Fern feature converted into a decimal number and outputs a code result. If a preset code type of the target function is a two-dimensional barcode, and an output result is assumed to be 1, a code type of the target image is determined as a two-dimensional barcode, and if the output result is 0, the code type of the target image is determined not as a two-dimensional barcode. If the preset code type of the target function is a one-dimensional barcode, and the output result is assumed to be 1, the code type of the target image is determined as a one-dimensional barcode, and if the output result is 0, the code type of the target image is determined not as a one-dimensional barcode.

In actual application, an image sliding window filtered by an LBP weak classifier is sent to a Fern feature calculation module to extract a Fern feature. The Fern feature is represented by n binary bits, and represents a decimal number in a range of 0 to $2^n-1$. Each binary bit represents relative magnitude of grayscale values of a pair of pixels at any position in an image, as the following formula:

$$f_{Fern}=b_{n-1}b_{n-2}\ldots b_0. \text{ When } I_i>I_j, b_k=1, \text{ and when } I_i \leq I_j, b_k=0, 0 \leq k < n,$$

where i and j respectively represent any two pixels, and b represents a binary bit.

It can be learned that the Fern feature represents magnitude of grayscale values of several pairs of pixels in an image, and is suitable for being configured to detect a target image including random monochrome areas, for example, a one-dimensional barcode/a two-dimensional barcode. Calculation complexity of the Fern feature is relatively low. Basic operations such as taking a value, comparison, and shifting are needed at an image original grayscale value level, thereby achieving an object of quickly identifying an image.

Figure 6B:
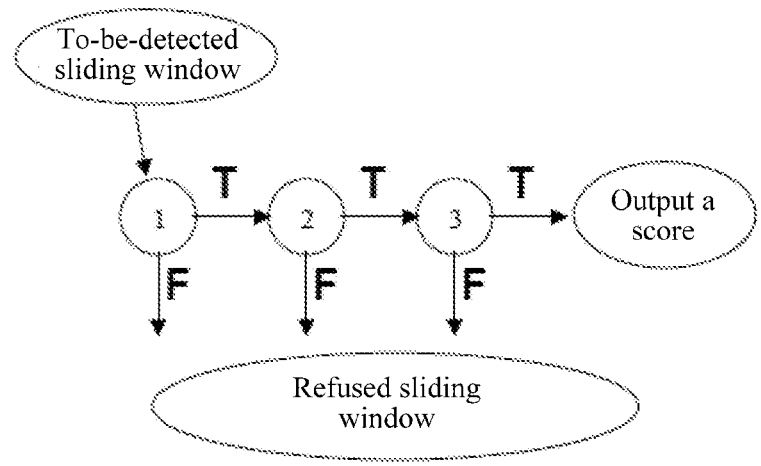
FIG. 6b is a schematic flowchart showing that a cascade classifier runs according to an embodiment of the present disclosure.

In actual application, after a value $f_{Fern}$ of a Fern feature of an image area within a sliding window is calculated, the value $f_{Fern}$ is input into a trained classifier. In the embodiment of the present disclosure, a Cascade Boosting proposed by Viola Jones is used. The structure is still a classical algorithm of quick detection in computer vision. A basic idea of algorithm is that strong classifiers are set as a level cascade structure according to an order of complexity. A training sample of each subsequent classifier is a sample that passes through all previous classifiers. If any cascaded classifier refuses a sliding window, the sliding window is not further detected any more. As shown in FIG. 6b, there are three classifiers. A Fern feature is input from a classifier 1. If the classifier 1 refuses a sliding window that inputs the Fern feature, detection on the sliding window is stopped. If the classifier 1 does not refuse the sliding window, the sliding window continues to pass through a classifier 2 to be detected, by such analogy.

Each classifier is a 2-class classifier, and may be regarded as a function h that is mapped from an input feature x to an output class w. In the embodiment of the present disclosure, a input feature value is a decimal number in a range of 0 to 64. The output class is 1 (belonging to a code of the class) or 0 (not belonging to a code of the class).

The function h is represented as: conf(x)=h(x,θ); and w=sign(conf(x)−thr), w=0,1.

θ is a parameter of a classifier, and is obtained by training a sample. Sign is a sign(x) function. When an input is greater than 0, an output is 1, and when an input is less than 0, an output is 0. Conf is a confidence score output by the classifier. The score is compared with a threshold thr obtained by training. If the score is greater than the threshold thr, the output class w=1, and if the score is less than the threshold thr, the output class w=0. When testing is performed, to reduce calculation complexity, a classifier mapping value obtained by training is stored as a fixed list, and search the list according to an input Fern feature value $f_{Fern}$ to obtain a corresponding confidence score.

In a training stage, a batch of different one-dimensional barcodes and two-dimensional barcodes in various angles, lights and shooting conditions are collected. To reduce class differences, Fern features and classifiers are respectively trained for the one-dimensional barcodes and the two-dimensional barcodes. When testing is performed, one-dimensional barcode feature extraction and classification and one-dimensional barcode feature extraction and classification are respectively performed on each sliding window, and classification results w1 and w2 of two kinds of classifiers are obtained. If the two results are both 1, a result of a greater confidence score is selected as a final class output.

Figure 9:
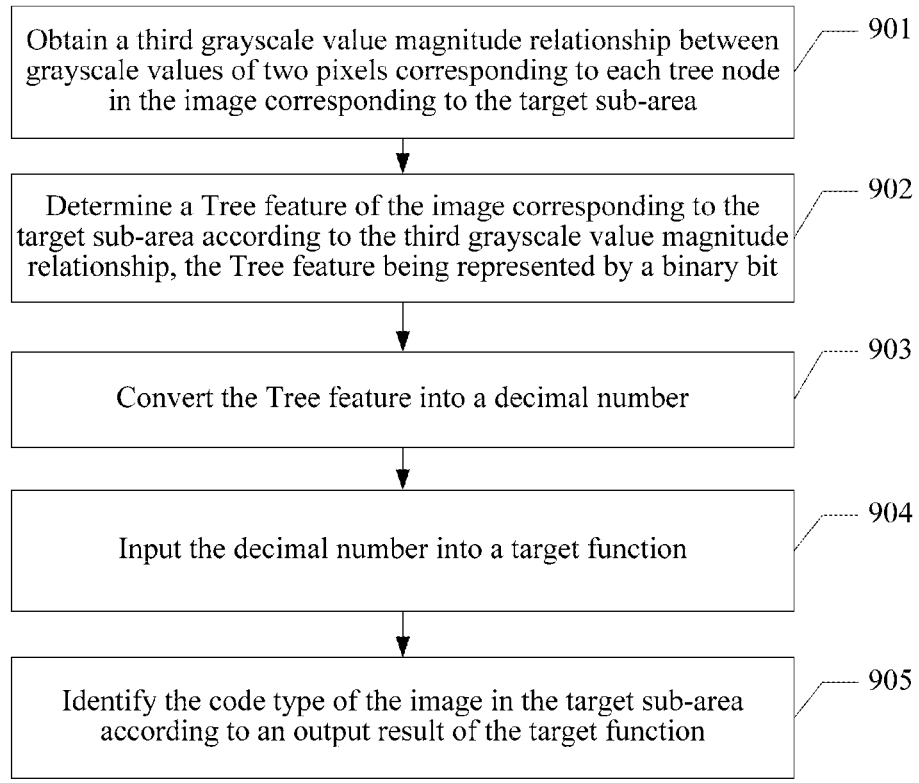
FIG. 9 is another schematic flowchart of a code type of an identified image according to an embodiment of the present disclosure.

In some other possible implementations, as shown in FIG. 9, when the second image feature is a Tree feature, the obtaining a second image feature of an image corresponding to the target sub-area and identifying a code type of the image in the target sub-area according to the second image feature includes the following process:

Step S901: Obtain a third grayscale value magnitude relationship between grayscale values of two pixels corresponding to each tree node in the image corresponding to the target sub-area.

In the embodiment of the present disclosure, grayscale values of any two pixels corresponding to each tree node in the image corresponding to the target sub-area are obtained. It is assumed that a grayscale value of a pixel a is $I_1$, and a grayscale value of a pixel b is $I_2$. $I_1 > I_2$ is a third grayscale value magnitude relationship between a pixel a and a pixel b provided that $I_1 > I_2$.

Step S902: Determine a Tree feature of the image corresponding to the target sub-area according to the third grayscale value magnitude relationship, the Tree feature being represented by a binary bit.

Step S903: Convert the Tree feature into a decimal number.

Step S904: Input the decimal number into a target function.

Step S905: Identify the coding type of the image in the target sub-area according to an output result of the target function.

Similar to step S805, a target function is a function that inputs a Fern feature converted into a decimal number and outputs a code result. If a preset code type of the target function is a two-dimensional barcode, and an output result is assumed to be 1, a code type of the target image is as a two-dimensional barcode, and if the output result is 0, the code type of the target image is determined not as a two-dimensional barcode. If the preset code type of the target function is a one-dimensional barcode, and the output result is assumed to be 1, the code type of the target image is determined as a one-dimensional barcode, and if the output result is 0, the code type of the target image is determined not as a one-dimensional barcode.

Figure 6C:
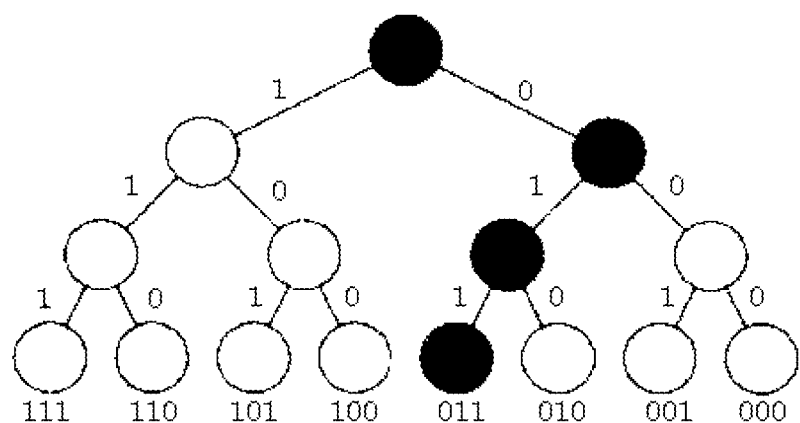
FIG. 6c is a schematic flowchart of a Tree feature according to an embodiment of the present disclosure.

In actual application, using a three-layer tree feature in FIG. 6c as an example, in each tree node, grayscale values of two pixels are compared. A greater one takes a node left branch, and a less one takes a right branch. Each branch is analogized in sequence until reaching a leaf node. Each left branch is assigned with 1, and each right branch is assigned with 0. According to 1 or 0 on a tandem branch of the route taken, a final binary bit is obtained when reaching a leaf node at a bottom layer. In FIG. 6c, the final binary bit is 011, and is 3 after converted into a decimal number. That is, a final feature value is 3. Therefore, a statistical value used for a number of LBP hoppings may also be converted into a statistical value of a Sobel gradient. A Sobel operator is an operator relatively usually used for gradient calculation. A calculation formula of the operator is as follows:

$$G_x = z_3 + 2*z_6 + z_9 - (z_1 + 2*z_4 + z_7)$$

$$G_y = z_7 + 2*z_8 + z_9 - (z_1 + 2*z_2 + z_3)$$

$$G = |G_x| + |G_y|$$

Figures 6D, 6E:
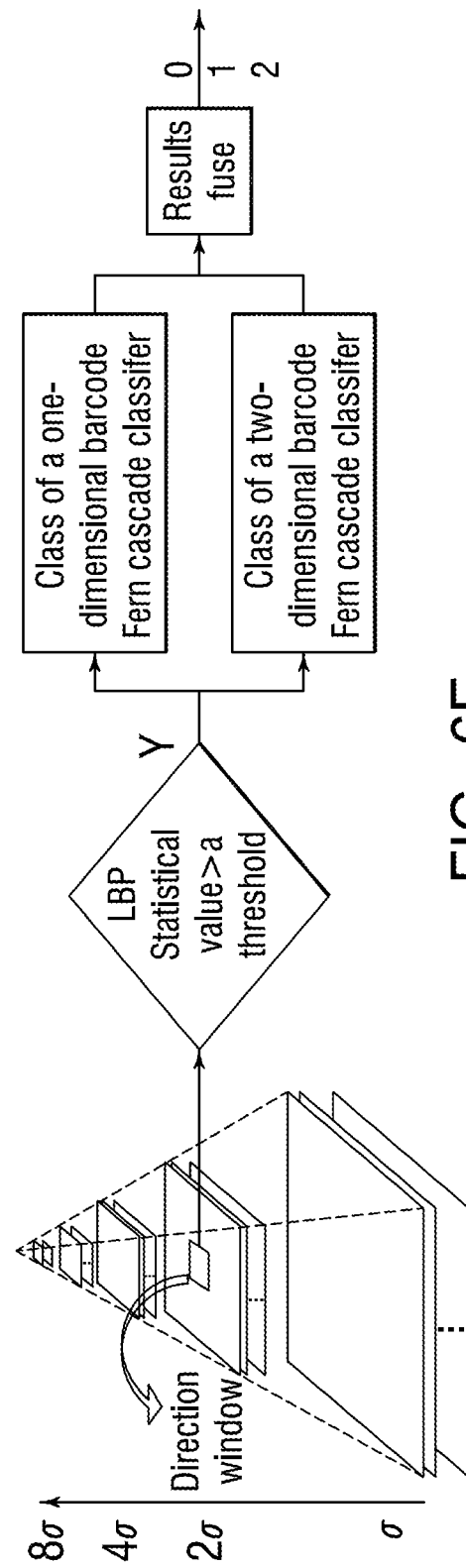
FIG. 6d is a schematic flowchart of a gradient value according to an embodiment of the present disclosure.
FIG. 6e is a schematic diagram of an application scenario of a code type of an identified image according to an embodiment of the present disclosure.

In the formula, $z_1$ to $z_9$ respectively represent gradient values of pixels with a 3*3 neighborhood. As shown in FIG. 6d, because a Sobel gradient operator can reflect a gradient change of an image and texture complexity, LBP hopping value filtering may be changed to Sobel gradient value filtering, to achieve a same rough filtering effect.

Figure 6F:
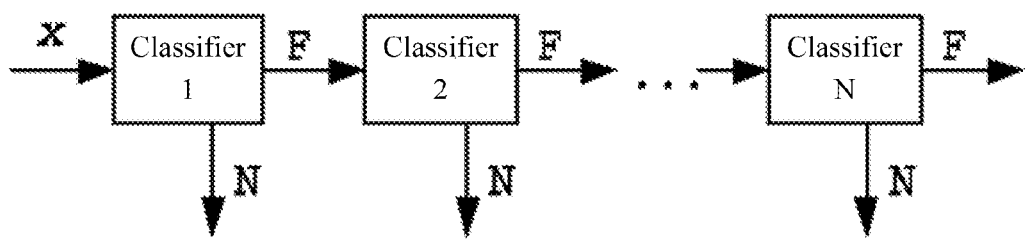
FIG. 6f is a schematic flowchart showing that another cascade classifier runs according to an embodiment of the present disclosure.

In actual application, a complete classification architecture is shown in FIG. 6e, including two parts, that is, LBP weak classifier filtering and Fern cascade classifier classification. Final output results are 0, 1, and 2, where 0 represents no barcode, 1 represents a one-dimensional barcode, and 2 represents a two-dimensional barcode. According to different features used, the classifier may alternatively be a classifier of another structure such as a soft cascade. The soft cascade is an improved cascade boosting. As shown in FIG. 6f, a conventional cascade boosting includes different layers. Each layer includes several classifiers. An input passes through each classifier in sequence and output values of classifiers at the layer are added up and are compared with a threshold at the layer, to determine whether to pass to next layer. The soft cascade does not have layers. A score obtained when the input passes through each classifier is compared with a threshold of the classifier, thereby determining whether to pass to next classifier. A calculation speed of the soft cascade is quicker than that of the conventional cascade boosting because it may be determined whether to continue when passing through a weak classifier.

By using descriptions of the foregoing image identification method, in actual application, to verify an improvement function of the identification method in the embodiment of the present disclosure on a barcode scanning engine speed, some terminals are selected to be tested, and running time and an identification rate are mainly tested. A contrast experiment of running time is divided into two groups, one group is a contrast experiment (as shown in Table 1) of average running time, which is added with a prediction algorithm, and average running time, which is not added with a prediction algorithm, of no barcode samples on main models, and the other group is a contrast experiment (as shown in Table 2) of average running time, which is added with a prediction algorithm, and average running time, which is not added with a prediction algorithm, of barcode (a one-dimensional barcode/a two-dimensional barcode) samples.

TABLE 1

Contrast of no barcode sample testing speeds of different models

| Model | Average Running Time (ms) Added with a prediction algorithm | Average Running Time (ms) Not added with a prediction algorithm |
|---|---|---|
| Iphone 6plus | 6.5 | 140 |
| Iphone 5s | 8 | 140 |
| Iphone 5 | 21 | 150 |
| Galaxy s6Edge | 40 | 400 |
| Xiaomi Note | 40 | 140 |
| Nexus 5 | 45 | 340 |

TABLE 2

Contrast of barcode sample testing speeds

| | Old Version of a QBar Barcode Scanning Engine One-dimensional barcode Identification time | New Version of a QBar Barcode Scanning Engine Two-dimensional barcode Identification time | Total identification time |
|---|---|---|---|
| Added with a prediction algorithm | 414.603 | 253.297 | 333.95 |
| Not added with a prediction algorithm | 397.089 | 381.821 | 389.455 |

It can be learned that for a no barcode image, each processing speed of a main model is improved to a relatively great extent, and average running time of some models reduces to within 10 ms. For a barcode image, average identification time of a one-dimensional barcode is slightly slower than an original method, but a different is not great. Average identification time of a two-dimensional barcode relatively shortens approximately 130 ms, and total identification time shortens approximately 50 ms.

In an aspect of an identification rate, contrast of identification rates of one-dimensional barcodes and two-dimensional barcodes on different sample sets are respectively tested (respectively as shown in FIG. 3 and FIG. 4).

TABLE 3

Contrast of identification rates of two-dimensional barcodes

| Testing Set | | Google Standard | Mobile Phone Real Shooting | Printed Receipt Real Shooting |
|---|---|---|---|---|
| Correct rate (%) | Added with a prediction algorithm | 82.81 | 69.49 | 32.59 |
| Correct rate (%) | Closing a prediction algorithm | 82.81 | 69.83 | 32.59 |

TABLE 4

Contrast of identification rates of one-dimensional barcodes

| Testing Set | | Google Standard | Fuzzy Barcode |
|---|---|---|---|
| Correct rate (%) | Added with a prediction algorithm | 61.8 | 27.92 |
| Correct rate (%) | Closing a prediction algorithm | 61.8 | 27.92 |

Testing statistics indicates that except that a two-dimensional barcode testing set of mobile phone real shooting suffers a few (0.34%) performance losses, identification rates of other sample sets remain unchanged. Adding of the image identification method ensures identification performance, and reduces blocking of a client, so that an identification response is more timely.

To facilitate better implementation of the foregoing method of the embodiment of the present disclosure, the following further provides a related apparatus configured to cooperatively implement the foregoing method.

Figure 10:
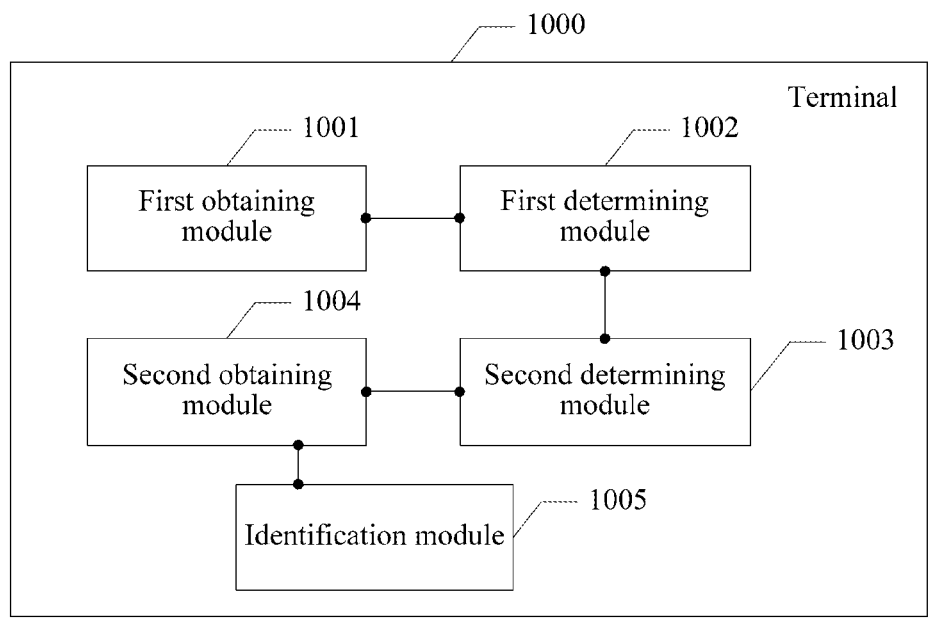
FIG. 10 is another schematic structural diagram of a terminal according to an embodiment of the present disclosure.

As shown in FIG. 10, FIG. 10 is a schematic structural diagram of a terminal 1000 according to an embodiment of the present disclosure. The terminal 1000 includes: a first obtaining module 1001, a first determining module 1002, a second determining module 1003, a second obtaining module 1004, and an identification module 1005.

The first obtaining module 1001 is configured to obtain a first image feature of a target image;

the first determining module 1002 is configured to determine a target area of the target image according to the first image feature;

a second determining module 1003 is configured to: divide the target area into a plurality of sub-areas, and determine a target sub-area of the target image by filtering the sub-areas;

a second obtaining module 1004 is configured to obtain a second image feature of an image in the target sub-area; and an identification module 1005 is configured to identify a coding type of the image in the target sub-area according to the second image feature, the coding type including at least one of a one-dimensional barcode, a two-dimensional barcode or no barcode.

In some possible implementations, the first image feature is a grayscale value, and the first determining module 1002 is further configured to: determine a first absolute value corresponding to each pixel in the target image, and the first absolute value is an absolute value of a difference between a gradient of a grayscale value of the pixel in a horizontal direction and a gradient of a grayscale value of the pixel in a vertical direction; respectively compare the first absolute value corresponding to each pixel with a first preset threshold; and determine an area corresponding to all pixels whose first absolute values are greater than the first preset threshold, as the target area.

In some possible implementations, the first image feature is a grayscale value, and the first determining module 1002 is specifically configured to: determine a second absolute value corresponding to any two pixels in the target image, and the second absolute value is an absolute value of a difference between grayscale values of the any two pixels; compare the second absolute value with a second preset threshold; and determine an area corresponding to all pixels whose second absolute values are less than the second preset threshold, as the target area.

In some possible implementations, the second determining module 1003 is specifically configured to: determine a first pixel in an image corresponding to each sub-area, and adjacent pixels adjacent to the first pixel; determine a first grayscale value magnitude relationship between a grayscale value of the first pixel and a grayscale value of each of the adjacent pixels; determine, according to the first grayscale value magnitude relationship, a local binary pattern (LBP) code of each adjacent pixel of the first pixel; determine a number of LBP code hoppings in the local binary pattern (LBP) code of each adjacent pixel of the first pixel, and the number of LBP code hoppings is a number of times of changing from 1 to 0 or changing from 0 to 1; obtain a sum of numbers of LBP code hoppings of all pixels in the image corresponding to each sub-area; and determine a sub-area whose sum of the numbers of the LBP code hoppings is greater than a third preset threshold, as the target sub-area.

In some possible implementations, the second determining module 1003 is specifically configured to: determine a first absolute sum value of each pixel in an image corresponding to each sub-area, the first absolute sum value is a sum of an absolute value of a grayscale value of the pixel in a horizontal direction and an absolute value of a grayscale value of the pixel in a vertical direction; obtain a sum of first absolute sum values of all pixels in the image corresponding to each sub-area; and determine a sub-area whose sum of the first absolute sum values is greater than a fourth preset threshold, as the target sub-area.

In some possible implementations, when the second image feature is a Fern feature, the second obtaining module 1004 is specifically configured to: obtain a second grayscale value magnitude relationship between grayscale values of any two pixels in the image corresponding to the target sub-area; and determine a Fern feature of the image corresponding to the target sub-area according to the second grayscale value magnitude relationship, and the Fern feature is represented by a binary bit.

The identification module 1005 is configured to: convert the Fern feature into a decimal number; input the decimal number into a target function; and identify the coding type of the image in the target sub-area according to an output result of the target function.

In some possible implementations, when the second image feature is a Tree feature, the second obtaining module 1004 is specifically configured to: obtain a third grayscale value magnitude relationship between grayscale values of two pixels corresponding to each tree node in the image corresponding to the target sub-area; determine a Tree feature of the image corresponding to the target sub-area according to the third grayscale value magnitude relationship, and the Tree feature is represented by a binary bit.

The identification module 1005 is configured to: convert the Tree feature into a decimal number; input the decimal number into a target function; and identify the coding type of the image in the target sub-area according to an output result of the target function.

In conclusion, after a first image feature of a target image is obtained, a target area of the target image is determined according to the first image feature. For example, an approximate code area is determined according to the first image feature. A target sub-area of the target image is determined by filtering images corresponding to the target area. A code type of the image in the target sub-area is identified according to an obtained second image feature of an image corresponding to the target sub-area. For example, an accurate code area is determined within the approximate code area, and then the code type of the image is identified on the accurate code area, for example, a one-dimensional barcode, a two-dimensional barcode or no barcode. It can be learned that the code type is not limited to a one-dimensional barcode, and may alternatively be other code images besides the one-dimensional barcode, thereby effectively improving universality and reliability of identifying an image. A morphological operation and a connected domain analysis on an image are not needed, thereby effectively improving a velocity of identifying an image.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it is understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure or all or some of the technical solutions may be implemented in the form of a software product. The computer software product is stored in a storage medium and includes several instructions for instructing a computer device (which may be a personal computer, a terminal, or a network device) to perform all or some of the steps of the methods described in the embodiments of the present disclosure. The foregoing storage medium includes: any medium that can store program code, such as a USB flash memory drive, a removable hard disk, a read-only memory (ROM, Read-Only Memory), a random access memory (RAM, Random Access Memory), a magnetic disk, or an optical disc.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for image identification, comprising:
   obtaining, by processing circuitry of an apparatus, first feature values of a first image feature for pixels in an image for barcode detection;
   calculating measures that are indicative of changes of the first feature values in multiple directions within the image;
   determining a target area in the image for the barcode detection according to the measures;
   dividing the target area into a plurality of sub-areas;
   filtering the sub-areas to determine a target sub-area for the barcode detection;
   obtaining second feature values of a second image feature for the target sub-area, the second image feature being derived from the first image feature; and
   identifying a barcode type in the target sub-area according to the second image feature.

2. The method according to claim 1, wherein the first image feature is of a grayscale feature type, and the method comprises:
   calculating, for a pixel of the pixels in the image, a first gradient value of the first image feature in a first direction of the image;
   calculating, for the pixel, a second gradient value of the grayscale feature type in a second direction of the image, the first direction and the second direction being perpendicular;
   calculating a first absolute value of a difference between the first gradient value and the second gradient value; and
   including the pixel in the target area when the first absolute value is greater than a first preset threshold.

3. The method according to claim 1, wherein the first image feature is of a grayscale feature type, and the method comprises:
   combining a group of pixels with grayscale differences in a range into the target area, the range being determined according to a second preset threshold.

4. The method according to claim 1, wherein the filtering the sub-areas to determine the target sub-area for the barcode detection further comprises:
   selecting, for each pixel in a group of pixels in a sub-area of the sub-areas, adjacent pixels in the sub-area that are adjacent to the respective pixel;
   determining first comparison relationships of grayscale values between the respective pixel and the adjacent pixels;
   forming a local binary pattern (LBP) code, according to the first comparison relationships;
   determining a number of binary switching in the LBP code to be associated with the respective pixel;
   calculating a sum of the numbers of the binary switching associated with the group of pixels in the sub-area; and
   determining the sub-area as the target sub-area when the sum of the binary switching in the sub-area is greater than a third preset threshold.

5. The method according to claim 1, wherein the filtering the sub-areas to determine the target sub-area for the barcode detection further comprises:
   calculating, for each pixel in a group of the pixels in a sub-area of the sub-areas, a first absolute value of a first grayscale value in a horizontal direction;
   calculating, for the respective pixel, a second absolute value of a second grayscale value in a vertical direction;
   adding the first absolute value and the second absolute value to calculate an absolute sum value that is associated with the respective pixel;
   adding the absolute sum values associated with the group of the pixels in the sub-area to calculate a filtering value; and
   determining the sub-area to be the target sub-area when the filing value is greater than a fourth preset threshold.

6. The method according to claim 1, wherein the second image feature is a Fern feature, and the obtaining the second feature values of the second image feature for the target sub-area comprises:
   determining second comparison relationships of every two pixels in a group of pixels in the target sub-area; and
   obtaining the Fern feature in binary based on the second comparison relationships.

7. The method according to claim 6, wherein the identifying the barcode type in the target sub-area according to the second image feature further comprises:
   converting the Fern feature into a decimal number;
   inputting the decimal number into a target function associated with a specific barcode type; and
   determining whether the barcode type of the image in the target sub-area is the specific barcode type according to an output result of the target function.

8. The method according to claim 1, wherein the second image feature is a Tree feature, and the obtaining the second feature values of the second image feature for the target sub-area comprises:
   forming a tree structure using a group of pixels in the target sub-area as tree nodes;
   determining third comparison relationships of branches at the tree nodes; and
   determining the Tree feature in binary by walking the tree structure from a root tree node to a leaf tree node based on the third comparison relationships.

9. The method according to claim 8, wherein the identifying the barcode type in the target sub-area according to the second image feature further comprises:

converting the Tree feature into a decimal number;
inputting the decimal number into a target function associated with a specific barcode type; and
determining whether the barcode type of the image in the target sub-area is the specific barcode type according to an output result of the target function.

10. An apparatus, comprising:
interface circuitry configured to receive an image for barcode detection; and
processing circuitry configured to:
obtain first feature values of a first image feature for pixels in the image for barcode detection;
calculate measures that are indicative of changes of the first feature values in multiple directions within the image;
determine a target area in the image for the barcode detection according to the measures;
divide the target area into a plurality of sub-areas;
filter the sub-areas to determine a target sub-area for the barcode detection;
obtain second feature values of a second image feature for the target sub-area, the second image feature being derived from the first image feature; and
identify a barcode type in the target sub-area according to the second image feature.

11. The apparatus according to claim 10, wherein the first image feature is of a grayscale feature type, and the processing circuitry is configured to:
calculate, for a pixel of the pixels in the image, a first gradient value of the first image feature in a first direction of the image;
calculate, for the pixel, a second gradient value of the grayscale feature type in a second direction of the image, the first direction and the second direction being perpendicular;
calculate a first absolute value of a difference between the first gradient value and the second gradient value; and
include the pixel in the target area when the first absolute value is greater than a first preset threshold.

12. The apparatus according to claim 10, wherein the first image feature is of a grayscale feature type, and the processing circuitry is configured to:
combine a group of pixels with grayscale differences in a range into the target area, the range being determined according to a second preset threshold.

13. The apparatus according to claim 10, wherein the processing circuitry is configured to:
select, for each pixel in a group of pixels in a sub-area of the sub-areas, adjacent pixels in the sub-area that are adjacent to the respective pixel;
determine first comparison relationships of grayscale values between the respective pixel and the adjacent pixels;
form a local binary pattern (LBP) code, according to the first comparison relationships;
determine a number of binary switching in the LBP code to be associated with the respective pixel;
calculate a sum of the numbers of the binary switching associated with the group of pixels in the sub-area; and
determine the sub-area as the target sub-area when the sum of the numbers of the binary switching in the sub-area is greater than a third preset threshold.

14. The apparatus according to claim 10, wherein the processing circuitry is configured to:
calculate, for each pixel in a group of the pixels in a sub-area of the sub-areas, a first absolute value of a first grayscale value in a horizontal direction;
calculate, for the respective pixel, a second absolute value of a second grayscale value in a vertical direction;
add the first absolute value and the second absolute value to calculate an absolute sum value that is associated with the respective pixel;
add the absolute sum values associated with the group of the pixels in the sub-area to calculate a filtering value;
determine the sub-area to be the target sub-area when the filing value is greater than a fourth preset threshold.

15. The apparatus according to claim 10, wherein the second image feature is a Fern feature, and the processing circuitry is configured to:
determine second comparison relationships of every two pixels in a group of pixels in the target sub-area; and
obtain the Fern feature in binary based on the second comparison relationships.

16. The apparatus according to claim 15, wherein the processing circuitry is configured to:
convert the Fern feature into a decimal number;
input the decimal number into a target function associated with a specific barcode type; and
determine whether the barcode type of the image in the target sub-area is the specific barcode type according to an output result of the target function.

17. The apparatus according to claim 9, wherein the second image feature is a Tree feature, and the processing circuitry is configured to:
form a tree structure using a group of pixels in the target sub-area as tree nodes;
determine third comparison relationships of branches at the tree nodes; and
determine the Tree feature in binary by walking the tree structure from a root tree node to a leaf tree node based on the third comparison relationships.

18. The apparatus according to claim 17, wherein the processing circuitry is configured to:
convert the Tree feature into a decimal number;
input the decimal number into a target function associated with a specific barcode type; and
determine whether the barcode type of the image in the target sub-area is the specific barcode type according to an output result of the target function.

19. A non-transitory computer-readable medium storing instructions which when executed by a computer cause the computer to perform:
obtaining first feature values of a first image feature for pixels in an image for barcode detection;
calculating measures that are indicative of changes of the first feature values in multiple directions within the image;
determining a target area in the image for the barcode detection according to the measures;
dividing the target area into a plurality of sub-areas;
filtering the sub-areas to determine a target sub-area for the barcode detection;
obtaining second feature values of a second image feature for the target sub-area, the second image feature being derivative of the first image feature; and
identifying a barcode type in the target sub-area according to the second image feature.

20. The non-transitory computer-readable medium of claim 19, wherein the first image feature is of a grayscale feature type, and the instructions cause the computer to further perform:
calculating, for a pixel of the pixels in the image, a first gradient value of the first image feature in a first direction of the image;

calculating, for the pixel, a second gradient value of the grayscale feature type in a second direction of the image, the first direction and the second direction being perpendicular;

calculating a first absolute value of a difference between the first gradient value and the second gradient value; and including the pixel in the target area when the first absolute value is greater than a first preset threshold.

* * * * *